United States Patent
Murakami

(10) Patent No.: US 6,637,993 B2
(45) Date of Patent: Oct. 28, 2003

(54) FLOATING NUT

(75) Inventor: Yuichi Murakami, Fujisawa (JP)

(73) Assignee: Mineba Co., Ltd., Nagano-Ken (JP)

( * ) Notice: Subject to any disclaimer, the term of this patent is extended or adjusted under 35 U.S.C. 154(b) by 0 days.

(21) Appl. No.: 10/068,881

(22) Filed: Feb. 11, 2002

(65) Prior Publication Data

US 2002/0110438 A1 Aug. 15, 2002

(30) Foreign Application Priority Data

Feb. 14, 2001 (JP) ........................................ 2001-036928

(51) Int. Cl.[7] .................................................. F16B 39/10
(52) U.S. Cl. ........................ 411/120; 411/112; 411/353; 411/999
(58) Field of Search ................................. 411/119, 120, 411/112, 353, 517, 518, 970, 999, 282, 914

(56) References Cited

U.S. PATENT DOCUMENTS

| | | | | |
|---|---|---|---|---|
| 279,182 A | * | 6/1883 | Preston | 411/119 |
| 4,074,011 A | * | 2/1978 | Teramae et al. | 428/422 |
| 4,193,435 A | * | 3/1980 | Frosch et al. | 411/113 |
| 4,734,001 A | * | 3/1988 | Bennett | 411/119 |
| 4,830,557 A | * | 5/1989 | Harris et al. | 411/113 |
| 4,884,420 A | * | 12/1989 | Finkel et al. | 70/58 |
| 5,033,924 A | * | 7/1991 | Cosenza | 411/282 |
| 5,630,686 A | * | 5/1997 | Billmann | 411/112 |
| 5,639,113 A | * | 6/1997 | Goss et al. | 280/728.2 |

* cited by examiner

Primary Examiner—Flemming Saether
Assistant Examiner—Jori Schiffman
(74) Attorney, Agent, or Firm—Oliff & Berridge, PLC

(57) ABSTRACT

There is provided a floating nut which opportunity of application can be expanded by increasing the floating amount of the floating nut. The clearance between the spline of an outer circumferential surface of a nut 6 and a spline opening 5b of a retainer 5 is freely set on the condition that the outside diameter $d_f$ of a flange 6c of the nut 6 and the outside diameter $d_j$ of a stop ring 7 are larger than the diameter of a spline opening 5b of the retainer 5. The applications of the floating nut 4 can be extended by determining the clearance between the spline of the outer circumferential surface of the nut 6 and the spline opening 5b of the retainer 5 according to the required floating amount.

8 Claims, 3 Drawing Sheets

FLOATING NUT

BACKGROUND OF THE INVENTION

1. Field of the Invention

The present invention relates to a floating nut which can be fastened at a high torque.

2. Description of the Related Art

In a case wherein components which are to be joined with each other after completion of manufacture are produced individually at predetermined dimensions, such as a satellite capsule of a space rocket and the rocket body, a so-called floating nut is generally used as a joining member to allow adjustment of dimensional difference occurred during the manufacturing process within a given tolerance when joining the respective components.

FIG. 4 shows a plan view of a conventional floating nut, and FIG. 5 shows a side plan view of the floating nut partly in section. A conventional floating nut 1 comprises a retainer 2 formed by folding a plate into a convex shape and a nut 3. The retainer 2 is folded in a convex shape as shown in FIG. 5, and holes 2a are opened at both ends thereof so as to pass a rivet, etc. to fix the retainer 2 to one of components to be joined with each other. Further, an opening 2b is formed in a center portion of the retainer 2, which is formed at a higher stage than both ends having the holes 2a, so as to pass the nut 3, and the retainer 2 has a width gradually increasing as approaching to the center thereof as shown in FIG. 4.

The nut 3 with a flange 3c is a 12-point nut and can be explained as that it has a shape of an external diameter in which coaxial hexagons of the same dimension are mutually deviated by 30°. The nut 3 has a caulking portion 3d, which is to be elliptically caulked after the nut 3 is engaged with a corresponding bolt (not shown), whereby a female screw 3e of the nut 3 can be firmly fixed to a male screw of the bolt resulting in a high tightening torque.

In addition, the opening 2b of the retainer 2 has twelve recesses 2c formed at equal spacing corresponding to projections 3a of the nut 3. Twelve protrusions 2d located between the recesses 2c are abutted on the projections 3a of the nut 3 while ensuring a predetermined clearance to the projections 3a of the nut 3 by the recesses 2c, and the rotational angle of the nut 3 with respect to the retainer 2 within the opening 2b can be limited.

In the manufacturing process of the floating nut 1, the nut 3 is prevented from falling out from the opening 2b of the retainer 2 by caulking an upper end 3b of the projection 3a so that the upper end 3b protrudes from the recess 2c of the opening 2b after the nut 3 is passed through the opening 2b of the retainer 2 as shown in FIG. 5.

When the retainer 2 of the floating nut 1 is fixed to one of the components which are joined, the nut 3 becomes eccentric with respect to the retainer 2 by the clearance between the recess 2c of the opening 2b and the projection 3a of the nut 3 thereby being able to adjust the positional deviation to the bolt positioned by the other joined component achieving a reliable joining.

However, the conventional floating nut 1 included the following problems. In order to prevent the nut 3 from falling out from the opening 2b of the retainer 2, the upper end 3b of the projection 3a is caulked so that the upper end 3b protrudes from the recess 2c of the opening 2b in the floating nut 1 as shown in FIG. 5. However, the amount of the protrusion by means of the caulking is naturally limited. As a result, the clearance between the projection 3a of the nut 3 and the recess 2c of the retainer 2 is required to be kept at an amount less than the amount of the protrusion protruded by the caulking.

The clearance between the projection 3a of the nut 3 and the recess 2c of the retainer 2 has a direct relation in the floating amount of the nut 3 with respect to the retainer 2. Thus, in the conventional floating nut 1 it has been possible to obtain only a small floating amount and cover only a limited dimensional difference meaning that opportunity of application was limited.

SUMMARY OF THE INVENTION

The present invention has been made in light of the above problems. It is an object of the present invention to widen the opportunity of application of a floating nut by increasing the amount of floating of the floating nut which supports a nut with a retainer by floating.

In order to solve the above problems, according to a first aspect of the present invention, in a floating nut to support a nut passed through an opening of a retainer by floating with respect to the retainer, the nut comprises a protrusion and a recess having a predetermined difference in diameter on an outer circumferential surface, a flange of the outside diameter not less than the diameter of an opening of the retainer on a bottom, and a stop ring of the outside diameter not less than the diameter of the opening of the retainer at the height separated from the flange by at least the thickness of the opening portion of the retainer in an attachable/detachable manner, and the opening of the retainer is of the analogous shape ensuring a desired clearance with respect to the protrusion and the recess on the outer circumferential surface of the nut.

According to the present invention, the opening of the retainer has a shape analogous to the circumferential surface of the nut whereby a desired clearance between the opening of the retainer and the circumferential surface of the nut is secured, and thus the nut can be eccentric by the clearance. The nut further comprises the flange having the outside diameter not less than the diameter of the opening of the retainer on the bottom, and the stop ring having the outside diameter not less than the diameter of the opening of the retainer at the height separated from the flange by at least the thickness of the opening portion of the retainer in an attachable/detachable manner, and the nut is movable in the axial direction with respect to the retainer. The axially movable range of the nut with respect to the retainer is limited by the flange and the stop ring, and the nut is prevented from being detached from the retainer.

According to a second aspect of the present invention, in the floating nut according to the first aspect of the present invention, the clearance between the circumferential surface of the nut and the opening of the retainer analogous to the circumferential surface of the nut is determined according to the required floating amount.

According to the present invention, the desired floating amount can be secured since the clearance between the circumferential surface of the nut and the opening of the retainer analogous to the circumferential surface of the nut is determined according to the required floating amount. Also, in the present invention, the axially movable range of the nut with respect to the retainer is limited by the flange and the stop ring, and thus, the nut is prevented from falling out from the retainer.

According to a third aspect of the present invention, in the floating nut according to the first aspect of the present invention, the clearance between the protrusion and the recess of the nut and the analogous opening of the retainer is set to be greater than 1.52 mm.

According to the present invention, the clearance between the protrusion and the recess of the nut and the analogous opening of the retainer is set to be greater than 1.52 mm, and the floating amount greater than 0.76 mm in one direction can be obtained. Also, in the present invention, the axially movable range of the nut with respect to the retainer is limited by the flange and the stop ring, and thus, the nut is prevented from falling out from the retainer.

According to a fourth aspect of the present invention, in the floating nut according to any one of the first to third aspects of the present invention, the protrusion and the recess provided on the outer circumferential surface of the nut form the spline.

In the present invention, the protrusion and recess having a predetermined difference in diameter are obtained on the outer circumferential surface of the nut by the protruded and recessed shape of the spline. According to the present invention, the opening of the retainer forms the spline ensuring a desired clearance for the protrusion and recess on the outer circumferential surface of the nut, and the nut can be eccentric against the retainer by the clearance. Also in the present invention, the axially movable range of the nut with respect to the retainer is limited by the flange and the stop ring, and the nut is prevented from falling out from the retainer.

According to a fifth aspect of the present invention, in the floating nut according to any one of the first to fourth aspects of the present invention, the protrusion and recess provided on the outer circumferential surface of the nut have a groove so as to fit the stop ring therein.

In the present invention, the protrusion and recess provided on the outer circumferential surface of the nut have a groove to fit the stop ring therein, and the stop ring can be correctly positioned. Also, the stop ring is prevented from being detached therefrom.

According to a sixth aspect of the present invention, in the floating nut according to any one of the first to fifth aspects of the present invention, the nut has a caulking portion.

In the present invention, the female screw of the nut is firmly and closely attached to the male screw of the bolt by means of the caulking portion caulked in an elliptic shape after the nut is engaged with the bolt corresponding thereto and then locked, whereby a high tightening torque can be obtained.

According to a seventh aspect of the present invention, in the floating nut according to any one of the first to sixth aspects of the present invention, the retainer is a plate-like component folded in a convex shape.

According to the present invention, the nut has the stop ring at the height separated by the distance of not less than the thickness of the plate-like component from the flange, and the nut is movable in the axial direction with respect to the retainer. The axially movable range of the nut with respect to the retainer is limited by the flange and the stop ring, and the nut is prevented from being pulled out from the retainer.

According to an eighth aspect of the present invention, in the floating nut according to any one of the first to seventh aspects of the present invention, the retainer and the nut are surface treated to prevent galling between the protrusion and recess and the analogous opening, and further to prevent generation of rust.

According to the present invention, the galling between the protrusion and recess of the nut and the opening of the retainer being similar to the protrusion and recess of the nut, and generation of rust on the retainer and the nut can be effectively suppressed.

DESCRIPTION OF THE PREFERRED EMBODIMENTS

Figure 1:
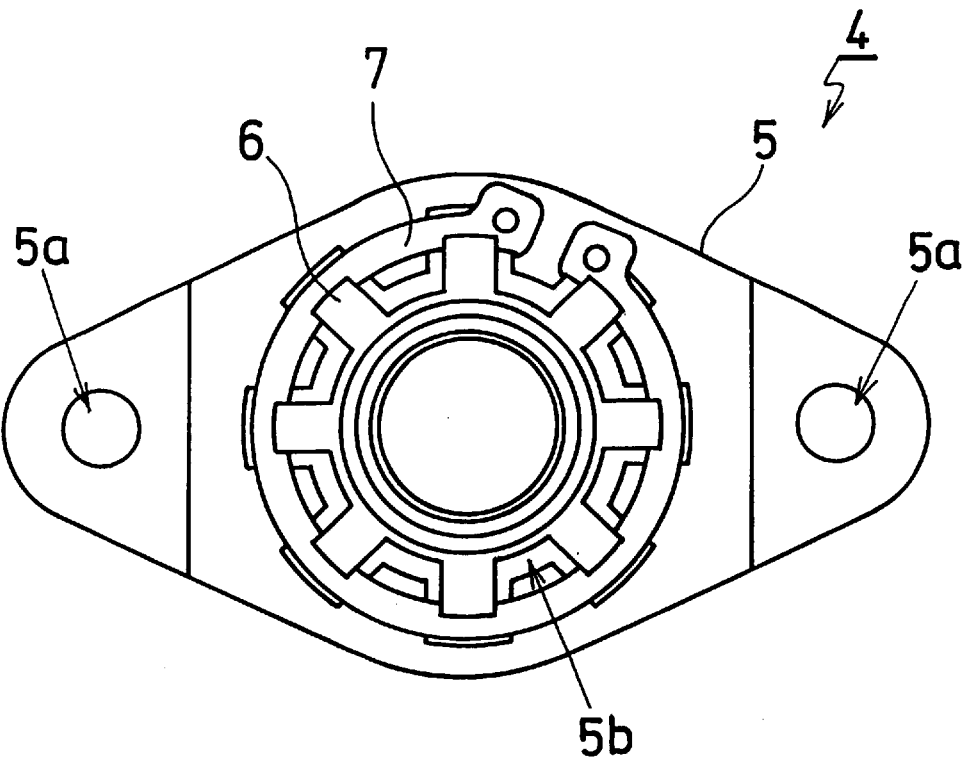
FIG. 1 is a plan view of a floating nut according to an embodiment of the present invention.

Preferred embodiments of the present invention are hereinafter explained referring to the attached drawings. FIG. 1 is a plan view of a floating nut according to the embodiment of the present invention, FIG. 2 is a side elevational view partly in section of the floating nut, and FIG. 3 is a cross-sectional view through the line A—A in FIG. 2.

A floating nut 4 according to the embodiment of the present invention comprises a retainer 5 formed by folding a plate in a convex shape, a nut 6 and a stop ring 7. The retainer 5 is folded in a convex shape as shown in FIG. 2, and a hole 5a to pass a rivet, etc. fixing the retainer 5 to one of two members to be joined when coupling the two members with the floating nut 4 is opened in both ends thereof. The retainer 5 has a center portion, which is higher by one stage than both ends having the hole 5a, and is gradually increased in width as approaching to the center thereof as shown in FIGS. 1 and 3, and an opening 5b passing a nut 6 is formed therein. The stage positioned between both ends of the retainer 5 is not less than the height of a flange 6c of the nut 6 so that the flange 6c of the nut 6 is accommodated within the step.

A spline is formed on an outer circumferential surface of the nut 6, and a predetermined difference in diameter is given between a protrusion 6a and a recess 6b of the spline. In the present embodiment, the difference in diameter between the protrusion 6a and the recess 6b of the spline is shown in FIG. 3, where $d_o$ is the diameter of the protrusion 6a of the spline, and $d_i$ is the diameter of the recess 6b of the spline. The outside diameter $d_f$ of the flange $6_c$ provided on a bottom of the nut 6 is not less than the diameter of an opening (the diameter $D_i$ of a protrusion 5c of the spline) of the retainer 5.

Figure 2:
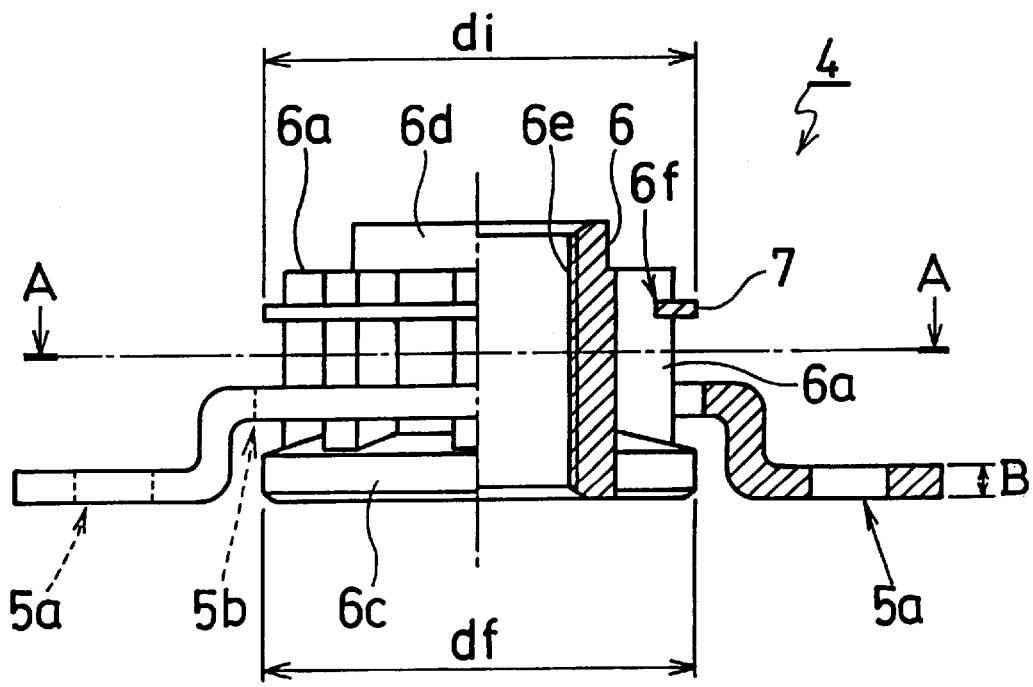
FIG. 2 is a side elevational view partly in section of the floating nut shown in FIG. 1.
Figure 3:
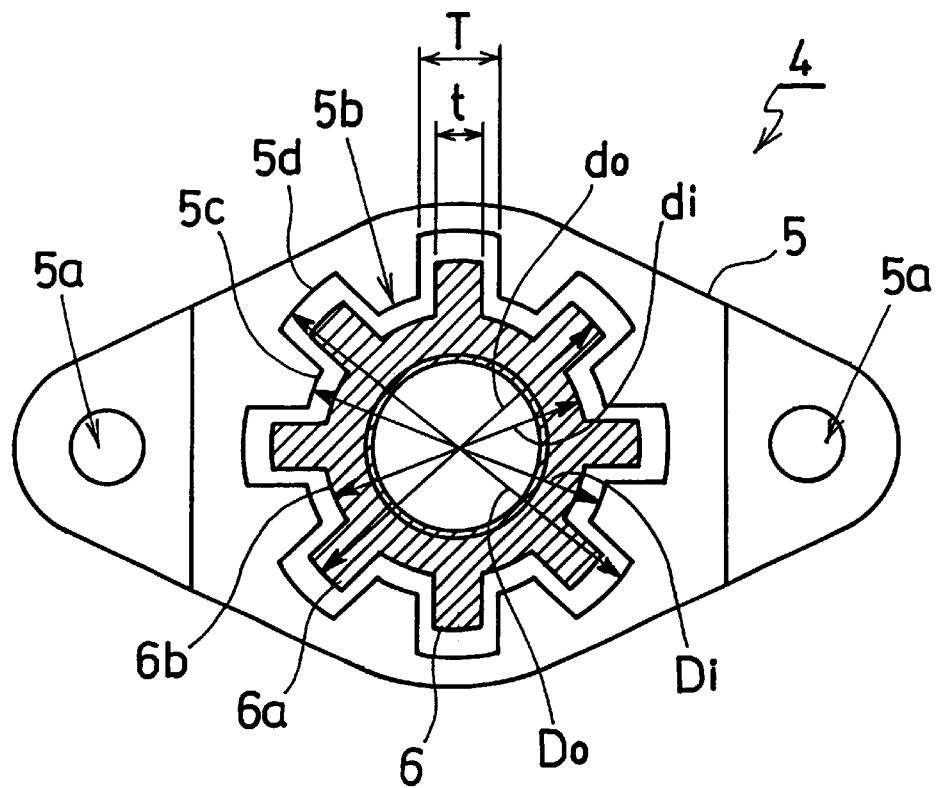
FIG. 3 is a cross-sectional view through the line A—A in FIG. 2.

In addition, as shown in FIG. 2, a groove 6f is provided at the height separated from the flange 6c by at least the thickness (B) of the retainer 5 of the protrusion 6a of the spline. The stop ring 7 having the outside diameter $d_j$ of not less than the diameter of the opening of the retainer 5 (the diameter $D_i$ of the protrusion 5c of the spline) is fitted in the groove 6f. The nut 6 has a caulking portion 6d. A female screw 6e of the nut 6 is firmly and closely attached to a male screw (not shown) to obtain a high tightening torque with the caulking portion 6d caulked in an elliptic shape after the nut 3 is engaged with a bolt corresponding thereto.

The opening 5b of the retainer 5 has an analogous shape (the spline shape) ensuring a desired clearance to the protrusion 6a and the recess 6b of the spline of the nut 6. The difference in diameter of the spline opening 5b from the protrusion 5c and the recess 5d is shown in FIG. 3, where $D_i$ is the diameter of the spline protrusion 5c and $D_o$ is the diameter of the spline recess 5d. The width of the recess 5d of the spline opening 5b is T, where t is the thickness of the spline protrusion 6a of the nut 6.

In the assembling procedure of the floating nut 4, firstly the protrusion 6a and the recess 6b of the spline of the nut 6 are aligned with the protrusion 5c and the recess 5d of the spline opening 5b of the retainer 5, respectively, and passed therethrough. Secondly, the stop ring 7 is fitted in the groove 6f of the nut 6. In this condition, the retainer 5 is located between the stop ring 7 and the flange 6c of the nut 6 as shown in FIG. 2.

In the floating nut 4 according to the present embodiment, the number n of the grooves of the spline is set to be 8, but the number n of the grooves can be variable as necessary, and selected in a range of n=2 m±1 (where, m is an integer between 2 and 6).

The floating nut 4 can be formed of a material taking into consideration of the required strength for the retainer 5 and the nut 6, and surface treated to prevent the galling of the spline of the nut 6 with the spline opening of the retainer 5, and to prevent generation of rust. The retainer 5 and the nut 6 are formed of high carbon chromium-manganese steel as $H_RC40$-50 through the heat treatment for strength, and further subjected to the surface treatment such as the plating and the application of molybdenum disulfide the to prevent galling and generation of rust of the spline portion.

The advantages obtained by the present embodiment of the above configuration are described below. The opening 5b of the retainer 5 has an analogous shape ensuring a desired clearance with respect to the protrusion 6a and the recess 6b on the outer circumferential surface of the nut 6, whereby the opening can be eccentric against the retainer 5 by this clearance. The nut 6 has the flange 6c of the outside diameter $d_f$ greater than the opening diameter (the diameter $D_i$ of the protrusion 5c) of the retainer 5 on the bottom thereof, and further has the stop ring 7 of the outside diameter $d_j$ greater than the opening diameter of the retainer 5 (the diameter $D_i$ of the protrusion 5c) at the height separated by at least the thickness B of the opening portion of the retainer 5 from the flange 6c in an attachable/detachable manner, whereby the nut 6 is movable in the axial direction with respect to the retainer 5. In addition, the axially movable range of the nut 6 with respect to the retainer 5 is limited by the flange 6c and the stop ring 7, and the nut 6 does not fall out from the retainer 5.

In joining two members with the floating nut 4, when the retainer 5 is fixed to one of the members to be joined, the nut 6 is eccentric against the retainer 5 by the clearance between the spline of the outer circumferential surface of the nut 6 and the spline opening 5b of the retainer 5 so as to be able to cover the positional deviation of the bolt positioned by the other member to be joined realizing in a reliable joining.

According to the present embodiment, the floating nut 4 can freely set the clearance between the spline of the outer circumferential surface of the nut 6 and the spline opening 5b of the retainer 5 on the condition that the outside diameter $d_f$ of the flange 6c of the nut 6 and the outside diameter $d_j$ of the stop ring 7 are larger than the opening diameter of the retainer 5 (the diameter $D_i$ of the protrusion 5c) thereby being able to ensure the required floating amount of the nut 6 with respect to the retainer. The opportunity of application of the floating nut 4 can be enhanced in such a manner as to determine the clearance between the spline of the outer circumferential surface of the nut 6 and the spline opening 5b of the retainer 5 according to the floating amount required.

Figure 4:
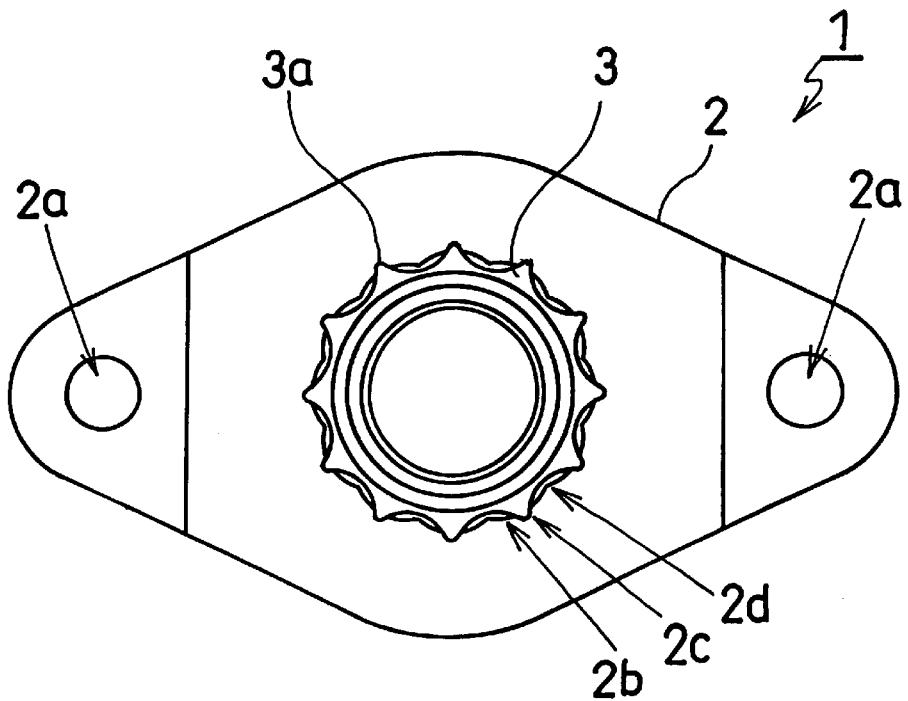
FIG. 4 is a plan view of a conventional floating nut.
Figure 5:
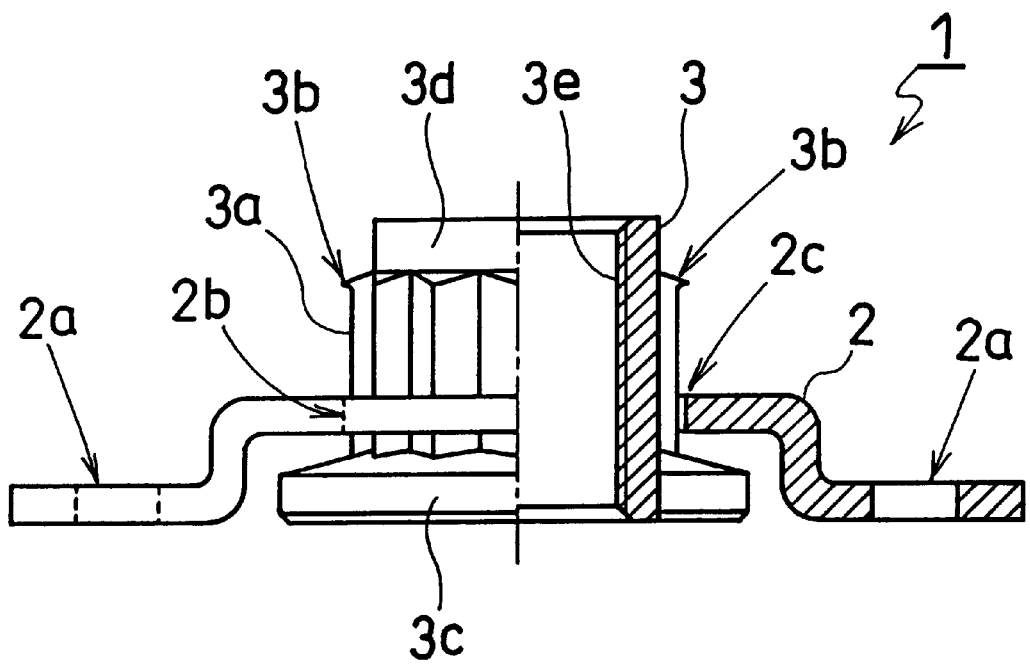
FIG. 5 is a side elevational view partly in section of the floating nut shown in FIG. 4.

For example, assuming that the floating amount of the conventional floating nut 1 shown in FIGS. 4 and 5 is limited to 0.25 mm in all directions, the present embodiment can attain the floating amount greater than 0.76 mm in all directions of the floating nut 4 by setting the clearance between the spline of the outer circumferential surface of the nut and the spline opening 5b of the retainer 5 to satisfy the inequalities $D_o-d_o \geqq 1.52$ mm, $D_i-d_i \geqq 1.52$ mm and $T-t \geqq 1.52$ mm.

Further, the floating nut 4 according to the present embodiment can correctly position the stop ring 7 by providing the groove 6f in the protrusion 6a of the spline provided on the outer circumferential surface of the nut 6 thereby being able to fit the stop ring 7 in the groove 6f. Moreover, the groove 6f works to prevent the stop ring 7 from falling off. And, the width of the protrusion 6a is of the spline shape with the width t, and this value t is larger than the ridge width of the 12-point nut 3 of a conventional example (refer to FIGS. 4 and 5) with a smaller biting width. As a result, the rupture strength of the protrusion 6a becomes larger than that of the conventional art, and generation of a so-called ridge collapse which has been occurring easily, can be prevented.

Further, the female screw 6e of the nut 6 can be firmly and closely attached to the male screw of the bolt (not shown) so as to be locked, and a high tightening torque can be obtained with the caulking portion 6d caulked in an elliptic shape after the nut 6 is engaged with the bolt corresponding thereto.

Still further, the retainer 5 is a plate-like component folded in a convex shape, whereby the nut 6 is supported by the plate-like retainer 5 by floating, and the required floating amount can be ensured in all directions. In addition, the generation of galling or rust can be effectively suppressed in such a manner as to conduct the surface treatment to the retainer 5 and the nut 6.

In the present embodiment, the shape of the retainer 5 is not limited to the convex shape shown in the figure but can be selected according to necessity. Further, the material of the retainer 5 and the nut 6 is not limited to high carbon steel but can be selected from other materials as required.

In the present invention, the floating nut can increase the floating amount of the floating nut to support the nut by the retainer by floating, whereby the opportunity of application of a floating nut can be increased.

What is claimed is:

1. A floating nut to support a nut passed through an opening of a retainer by floating with respect to said retainer,
    said nut comprises a number of rectangular shaped protrusions and recesses having a predetermined difference in diameter on an outer circumferential surface;
    a flange on the bottom of the nut having an outside diameter greater than the diameter of an opening of said retainer, and a stop ring having an outside diameter greater than the diameter of the opening of the retainer at a height separated from said flange by at least the thickness of the opening portion of said retainer and mounted in an attachable/detachable manner,
    wherein the opening of said retainer ensures a desired clearance between the retainer and the outer circumferential surface of said nut; and
    wherein each protrusion and the recess provided on the outer circumferential surface of said nut form a spline.

2. A floating nut according to claim 1, wherein the clearance between the each protrusion and recess of said nut and an opening of said retainer is determined according to a required floating amount.

3. A floating nut according to claim 1, wherein the clearance between the each protrusion and recess of said nut and the opening of said retainer is set to be greater than 1.52 mm.

4. A floating nut according to claim 1, wherein the number of protrusions and the recesses provided on the outer circumferential surface of said nut have a groove to fit said stop ring therein.

5. A floating nut according to claim 1, wherein said nut has a caulking portion.

6. A floating nut according to claim 1, wherein said retainer is a component folded in a convex shape.

7. A floating nut according to claim 1, wherein said retainer and said nut are surface treated to prevent gnawing between the number of protrusions and recesses and said opening, and prevent generation of rust.

8. A floating nut to support a nut passed through an opening of a retainer by floating with respect to said retainer, said nut comprising a number of rectangular shaped protrusions and recesses having a predetermined difference in diameter on an outer circumferential surface; and a flange on the bottom of the nut having an outside diameter greater than the diameter of an opening of said retainer, a retainer opening having a plurality of analogous rectangular shaped recesses and protrusions into which the number of protrusions and recesses of the nut are adapted to fit so as to allow for at least some relative radial movement between the nut and retainer and a stop ring having an outside diameter greater than the diameter of opening of the retainer at a height separated from said flange by at least the thickness of the opening portion of said retainer and mounted in an attachable/detachable manner.

* * * * *